(12) United States Patent
Rosenberg et al.

(10) Patent No.: US 11,076,073 B2
(45) Date of Patent: Jul. 27, 2021

(54) CAMERA ARRANGEMENT AND A METHOD FOR ALIGNING A SENSOR BOARD AND AN OPTICS UNIT

(71) Applicant: Axis AB, Lund (SE)

(72) Inventors: Johannes Rosenberg, Lund (SE); Andreas Karlsson Jägerman, Lund (SE)

(73) Assignee: Axis AB, Lund (SE)

( * ) Notice: Subject to any disclaimer, the term of this patent is extended or adjusted under 35 U.S.C. 154(b) by 100 days.

(21) Appl. No.: 16/393,914

(22) Filed: Apr. 24, 2019

(65) Prior Publication Data
US 2019/0356823 A1    Nov. 21, 2019

(30) Foreign Application Priority Data

May 17, 2018 (EP) .................................... 18172785

(51) Int. Cl.
*H04N 5/225*         (2006.01)

(52) U.S. Cl.
CPC ......... *H04N 5/2253* (2013.01); *H04N 5/2252* (2013.01); *H04N 5/2254* (2013.01); *H04N 5/22521* (2018.08)

(58) Field of Classification Search
CPC ..................... H01L 27/14683; H01L 27/14685
See application file for complete search history.

(56) References Cited

U.S. PATENT DOCUMENTS

| 7,330,211 | B2 | 2/2008 | Vook et al. | |
| 2004/0109079 | A1* | 6/2004 | Fujimoto | H04N 5/2254 348/340 |
| 2004/0251509 | A1* | 12/2004 | Choi | H04N 5/2254 257/432 |
| 2004/0258346 | A1* | 12/2004 | Omori | H01L 27/14625 385/14 |
| 2005/0007485 | A1* | 1/2005 | Vook | H04N 5/2254 348/345 |
| 2007/0058070 | A1 | 3/2007 | Chen | |
| 2007/0070228 | A1 | 3/2007 | Lee | |
| 2007/0228502 | A1* | 10/2007 | Minamio | H01L 27/14618 257/431 |

(Continued)

FOREIGN PATENT DOCUMENTS

| EP | 1174748 A2 | 1/2002 |
| EP | 1814312 A1 | 8/2007 |

(Continued)

*Primary Examiner* — Twyler L Haskins
*Assistant Examiner* — Dwight Alex C Tejano
(74) *Attorney, Agent, or Firm* — Volpe Koenig (57) ABSTRACT

A camera arrangement comprises an optics unit and a sensor board with an image sensor attached to a first surface of the sensor board facing the optics unit. An alignment element formed by a thermoplastic material is fixedly attached to the optics unit, and a biasing element is configured to bias the alignment element into abutment with a contact area of the sensor board. A heating element is arranged in the contact area. Upon activation the heating element is configured to transfer heat to the alignment element, such that the alignment element is heated at least partly to a temperature of at least the glass transition temperature of the thermoplastic material, for enabling alignment of the sensor board relative the optics unit.

16 Claims, 4 Drawing Sheets

(56) References Cited

U.S. PATENT DOCUMENTS

| | | | |
|---|---|---|---|
| 2009/0079863 A1 | 3/2009 | Aoki et al. | |
| 2009/0159200 A1* | 6/2009 | Rossi | H04N 5/2257 156/292 |
| 2010/0199491 A1* | 8/2010 | Watanabe | G02B 7/02 29/832 |
| 2012/0050589 A1* | 3/2012 | Ueno | H04N 9/04557 348/274 |
| 2012/0075519 A1* | 3/2012 | Blasch | H04N 5/23248 348/340 |
| 2013/0271641 A1* | 10/2013 | Calvet | G02B 7/022 348/340 |
| 2018/0176431 A1* | 6/2018 | Kim | G02B 27/0006 |

FOREIGN PATENT DOCUMENTS

| | | | |
|---|---|---|---|
| EP | 2372426 A1 * | 10/2011 | G02B 7/022 |
| EP | 2372426 A1 | 10/2011 | |
| EP | 3168682 A1 | 5/2017 | |
| JP | 11-271589 A | 10/1999 | |
| JP | 2009-204721 A | 9/2009 | |
| WO | 2010/029316 A2 | 3/2010 | |
| WO | 2012/038703 A2 | 3/2012 | |

\* cited by examiner

CAMERA ARRANGEMENT AND A METHOD FOR ALIGNING A SENSOR BOARD AND AN OPTICS UNIT

TECHNICAL FIELD

The invention relates to alignment of a sensor board relative an optics unit in a camera arrangement.

BACKGROUND OF THE INVENTION

Monitoring cameras are used in many different applications, both indoors and outdoors. The technical field relating to cameras is undergoing continuous development and improvement which have led to, for example, larger image resolutions, improved optics, and new functionalities.

A larger image resolution is obtained by a large image sensor with an increased number of pixels. A camera with such an image sensor is also more sensitive to misalignment between the image sensor and the optics unit which provides the image sensor with light representing the scene to be depicted. In other words, a higher pixel intensity in the image sensor also has the effect that a misalignment between the optics unit and the sensor board (image sensor PCBA) will have more impact on the quality of captured images. Thus, it is increasingly important to ensure a correct alignment between the optics unit and the image sensor in a camera arrangement.

A commonly used alignment technique for camera manufacturing today is active alignment. Here, a sensor board, comprising an image sensor, and an optics unit are adjusted in relation to each other based on images captured during the alignment process, in order to optimize quality characteristics (such as focus and centering of the light axis on the image sensor) of the resulting image.

In many active alignment techniques UV curing glue is used to fix the image sensor to the optics unit. The UV curing glue is applied between the image sensor and the optics unit. Thereafter the alignment, i.e. positioning of the image sensor and the optics unit relative each other, is performed. Finally, when the alignment is considered satisfactory, the glue is exposed to UV so that it solidifies and thereby fixes the positions of the image sensor and optics unit relative each other. The use of UV curing glue has several drawbacks including the need for storing the glue, the need for application of the glue which makes the process complex, outgassing, and that the curing of the glue is permanent and thus cannot be reversed. In addition, application of UV light may require specific knowledge, for example regarding wave length of the UV light, intensity output, curing time, curing depth, etc, to ensure correct hardening of the glue.

An alternative to active alignment is passive alignment. In this process the sensor board, the optics unit and the means, for example a screw attachment or a clamping device, for attaching the one to the other, are all designed with manufacturing tolerances reduced to such a level that when the camera arrangement is assembled, correct alignment of the sensor board and the optics unit is automatically provided. Passive alignment usually provides a less time consuming and more simple assembly process, but on the other hand it may prove challenging to reduce manufacturing tolerances to an acceptable level for a sensor with high pixel count.

In both passive and active alignment processes dust may enter the area between the image sensor and the optics unit and give rise to image deterioration. At least a part of the mounting process, including the active alignment process, therefore needs to be performed in a clean room environment.

It would be desirable to provide alignment in a camera arrangement between an optics unit and a sensor board in a manner which combines the advantages of the passive and active alignment.

SUMMARY OF THE INVENTION

A modified camera arrangement and method for alignment of such a modified camera arrangement improve the alignment between sensor board and optics unit in view of at least some of the drawbacks mentioned above.

According to a first aspect, a camera arrangement comprises an optics unit, a sensor board with an image sensor attached to a first surface of the sensor board facing the optics unit, an alignment element formed by a thermoplastic material, wherein the alignment element is fixedly attached to the optics unit, a biasing element which is configured to bias the alignment element into abutment with a contact area of the sensor board, and a heating element which is arranged in the contact area, and which upon activation is configured to transfer heat to the alignment element, such that the alignment element is heated at least partly to a temperature of at least the glass transition temperature of the thermoplastic material, for enabling alignment of the sensor board relative the optics unit.

With this camera arrangement the mounting, including alignment of the sensor board, can be performed in a simpler manner in accordance with a passive alignment process, while still allowing a post-assembly alignment such as an active alignment if needed. This will reduce the requirements on the mechanical tolerances needed for the different parts.

Arranging the heating element in the contact area at the sensor board means a fairly simple modification of the sensor board. The heating element may e.g., be provided in the form of a conductive trace or plate, to which power is connected to heat it. It is also fairly simple to provide power to the heating element via already existing power connections to the sensor board.

Additionally, prior art camera arrangements typically need to be mounted in a clean room, including the alignment of the optics unit and the sensor board relative each other, in order to avoid that dust enters the area between the image sensor (of the sensor board) and the optics unit. This is for example the case when using UV glue. Mounting process steps such as the application of the glue, the (active) alignment process, and curing the glue for fixing the positions of the optics unit and the sensor board relative each other, need to be performed in a clean room.

The approach disclosed hereinafter, however, may enable a simpler mounting process in that fewer steps of the mounting process need to be performed in a clean room. This is in particular the case when the alignment element, the optics unit, the biasing element and the sensor board are arranged such that a sealed space is provided for the image sensor when all parts are assembled. A clean room environment is then required during the assembly of the camera arrangement, but the subsequent alignment procedure does not require any clean room since the image sensor is located in, and thus protected by, the sealed space. Consequently, the clean room need not be adapted for the alignment process that typically requires lots of space and involves external equipment (that also need to be clean). Hence, a potentially less complex and less costly mounting process is achieved while still allowing a post-assembly alignment to be performed.

The camera arrangement also enables a simple alignment procedure for the sensor board relative the optics unit. Once assembled, there are only a few parameters to control for the alignment procedure, for example current force and current duration when using a heating element in the form of a resistive heating element, as is the case in some embodiments. The resistive heating element may be provided in the form of an electrically conductive thread, trace or plate arranged in the contact area, e.g., embedded in or arranged on the surface of the sensor board.

Thermoplastic material is, within the context of this application, meant to be a plastic material (a polymer) that becomes pliable or moldable above a specific temperature and solidifies upon cooling to a temperature below this specific temperature. The thermoplastic material may e.g., be an amorphous polymer or a liquid-crystal polymer (LCP) and may be chosen from the group of: Acrylonitrile butadiene styrene, Poly(methyl methacrylate), polystyrene, and polycarbonate (PC). It may be noted that PC is an advantageous material since it has a relatively low expansion when it is heated.

A thermoplastic material is associated with a glass transition temperature and a melting temperature, which is always higher than the glass transition temperature. When the thermoplastic material is heated to a temperature being at least the glass transition temperature but below the melting temperature, the thermoplastic material is in a glassy state. In the glassy state, the thermoplastic material assumes a state that can be referred to as a viscous or rubbery state in which the thermoplastic material is deformable without melting. The glass transition temperature may also be referred to as the softening temperature.

When at least a part of the alignment element is heated to a temperature of at least the glass transition temperature, that part of thermoplastic material in the alignment element is softened and assumes a glassy state such that the relative position between the sensor board and the optics unit may be adjusted by adjusting the position of the sensor board or the position of the optics unit. In other words, at least one of the sensor board and the optics unit may be moved by linear or tilt movement relative the other, and in view of an optical axis of the camera arrangement. In this manner, alignment of the sensor board relative the optics unit is enabled. When the heating element is deactivated, such that heat is no longer transferred from the heating element to the alignment element, the alignment element cools to a temperature below the glass transition temperature, and the thermoplastic material solidifies. In this way, the relative position between the sensor board and the optics unit is again fixed and cannot be adjusted. In other words, a new plane of alignment has in this way been created for the sensor board.

In the context of this application, "fixedly attached to" means that there is a non-elastic, or rigid, connection between the alignment element and the optics unit. This may be achieved e.g., by the optics element and the alignment element being formed in one piece or by the optics element and the alignment element being connected (fixedly attached), via a rigid connection element such as a screw joint or a (non-elastic) second clip or clamp.

In the context of this application, "bias into abutment" implies that the biasing element is configured to press, push or force the alignment element against (in the direction towards) the contact area, and, more specifically, into contact with the contact area. This means that if a portion of the alignment element is deformed such that it changes shape, such as being compressed to be reduced in height, during the alignment process, the biasing element will continue to cause the alignment element to abut the contact area, for example by at least partly elastically expanding from a more compressed state to a less compressed state, or by at least partly elastically contracting from an expanded (pulled apart) state to a less expanded state.

In one embodiment, the biasing element may comprise a first clip which biases the sensor board towards the optics unit. The alignment element is then pressed, clamped or sandwiched, between the optics unit and the sensor board, against (into contact with) the contact area on the sensor board. If a portion of the alignment element changes shape, typically changes height, as the alignment is performed, the first clip will continue to cause the alignment element to abut the contact area, by at least partly contracting from an expanded state to a less expanded state, due to the first clip having elastic properties.

In one embodiment, the biasing element comprises one or more magnets attached to the sensor board and to the optics unit, and the one or more magnets are elastically attached to at least one of the sensor board and the optics unit. The magnets will attach e.g., to a magnetic steel plate arranged on the sensor board in case the magnets are provided in the optics unit, and if the magnets are arranged on the sensor board such a magnetic steel plate or similar will be arranged on the optics unit. The one or more magnets may e.g., be provided as a ring-shaped magnet or as a set of magnets, both in order to provide a secure and stable attachment.

Using magnets to attach the sensor board to the optics unit provides a simple and quick assembling process, while allowing the camera arrangement to be easily disassembled if needed to e.g., remove dust from the image sensor.

In one embodiment, the biasing element comprises an elastic pad, a leaf spring or a compression spring. The alignment element is in this case pressed against the contact area by the compressed biasing element, and if a portion of the alignment element is deformed so that it changes shape (height) as the alignment is performed, the pad or spring will, due to its elastic properties, expand from its compressed state to a less compressed state and continue to cause the alignment element to abut the contact area, i.e. to bias the alignment element in abutment with the contact area.

In one embodiment, the end part of the alignment element, where the alignment element is configured to abut the contact area, has a rounded or tapered cross-sectional shape. This will reduce the amount of heat needed during the alignment process, since a smaller amount of thermoplastic material needs to be heated in order to make a change in the height of the alignment element. The contact area on the sensor board can also be made smaller which is advantageous for saving space on the surface of the sensor board. In addition, transferring less heat to the alignment element during the alignment will reduce the risk of changing the shape of the alignment element too much, which otherwise could be a risk if too much of the element were to be heated and thereby softened.

In one embodiment, the alignment element is located between the optics unit and the sensor board, and the contact area is located in an area of the first surface which surrounds the image sensor. In this embodiment, the alignment element is e.g., provided in one piece with the optics unit. The biasing element is in this embodiment provided e.g., in the form of a (elastic) first clip which clamps the sensor board to the optics unit with the alignment element sandwiched between the two.

In an alternative embodiment, the biasing element is located between the optics unit and the sensor board, and the contact area is located at a second surface of the sensor board, wherein the second surface is opposite to the first surface. Thus, the alignment element is in this embodiment located at an opposite side of the sensor board to the side where the image sensor is located. The biasing element may be provided e.g., in the form of an elastic pad, a leaf spring or a compression spring, or another type of compressible element which is at least partly compressed between the optics unit and the sensor board and thereby biases (presses, forces, pushes) the sensor board into abutment (contact) with the alignment element. The alignment element is in this embodiment fixedly attached to the optics unit e.g., via a screw joint or a second (non-elastic) clip.

In one embodiment, the alignment element comprises a plurality of pillars. The pillars are arranged to abut the contact area at the sensor board. The contact area may in this case include a corresponding plurality of separate contact areas, one for each pillar. Advantageously, at least three pillars are provided, to ensure that a stable alignment plane can be provided for the sensor board abutting the alignment pillars.

In one embodiment, the alignment element comprises a flange which is at least partly ring shaped (circular) or comprises at least two ridges which are arranged at an angle to each other or at a distance to each other, such that a stable alignment plane is formed by the flange for the sensor board. The flange may be arranged to abut the contact area of the sensor board, and the contact area may in turn have a shape corresponding to the shape of the flange. The flange may define an aperture for transmitting light from the optics unit to the sensor board.

According to a second aspect, a method of aligning a sensor board to an optics unit is provided, wherein an alignment element formed by a thermoplastic material is fixedly attached to the optics unit and biased into abutment with a contact area of the sensor board, wherein the method comprises the steps of activating a heating element arranged in the contact area, such that heat is transferred to the alignment element for heating the alignment element at least partly to a temperature of at least the glass transition temperature of the thermoplastic material, aligning the sensor board relative the optics unit, and de-activating the heating element for allowing the alignment element to cool to a temperature below the glass transition temperature.

The above disclosed embodiments are applicable to the second aspect as well. To avoid undue repetition, reference is made to the above.

In one embodiment, the step of aligning the sensor board relative the optics unit comprises placing the camera arrangement in an optical alignment jig, bringing the sensor board or the optics unit into abutment with an adjustment element, and the adjustment element applying a force to thereby align the sensor board and the optics unit relative each other. The adjustment element may, e.g., be provided in the form of a plurality of adjustment pins, an adjustment plate or a device gripping the sides of the sensor board or the optics unit.

The operation of activating the heating element may comprise providing a current through a resistive heating element.

The method may further comprise cooling the alignment element. By cooling in this context is meant an active cooling, such as providing an air flow or similar. The active cooling may accelerate the cooling process such that the alignment element solidifies faster.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF DRAWINGS

The above disclosed and other aspects of the present invention will now be described in more detail, with reference to the appended drawings showing embodiments of the invention.

It may be noted that figures are not necessarily to scale for purposes of clarity.

DETAILED DESCRIPTION

The aspects will now be described more fully with reference to the accompanying drawings, in which current embodiments are shown. However, the aspects may be embodied in many different forms and should not be construed as limited to the embodiments set forth herein.

Figure 1:
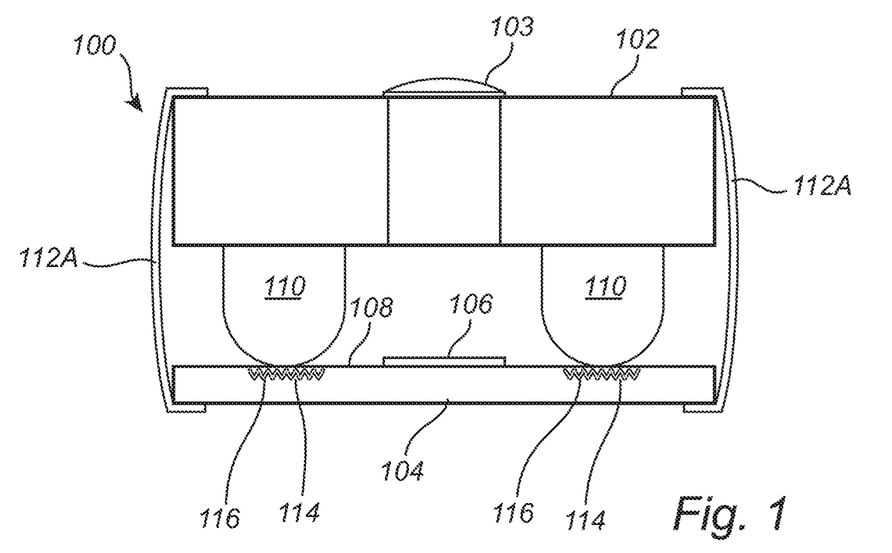
FIGS. 1-5 are sectional views of different embodiments of a camera arrangement.

FIG. 1 shows a camera arrangement 100 with an optics unit 102 and a sensor board (PCBA) 104. The camera arrangement 100 is typically part of a monitoring camera unit and may be placed in a camera housing (not shown) when used to monitor a scene. The optics unit 102 is arranged to hold a lens 103 through which light from the monitored scene is forwarded to an image sensor 106, such that images depicting the monitored scene may be formed with the help of further imaging and encoding software or hardware. The image sensor 106 is arranged on a first surface 108 of the sensor board 104. The first surface 108 faces the optics unit 102.

The camera arrangement 100 further comprises an alignment element 110 formed by a thermoplastic material. The alignment element 110 is in this embodiment arranged between the optics unit 102 and the sensor board 104, which contributes to a compact arrangement. The alignment element 110 may e.g., be made in one piece, i.e., integral, with the optics unit 102, such as through an injection molding process. The alignment element 110 may also be fixedly attached to the optics unit 102 via glue, a screw joint or other type of attachment means providing a fixed attachment.

The alignment element 110 may be in the form of a plurality of pillars. It may also be provided in the form of a flange, which may be at least partly ring-shaped (e.g., circular or elliptical). In case the alignment element 110 is a ring-shaped flange, it will typically form an aperture for light arriving via the lens 103 to the image sensor 106. As another option, the alignment element 110 may include two or more ridges, which may be arranged at an angle to each other or at a distance to each other.

In essence, the alignment element 110 has such a shape that it is able to provide a stable alignment plane for the sensor board 104. In case the sensor board 104 and the optics unit 102 are not properly aligned (plane parallel), the shape, or more correctly, the height, of part of the alignment element 110 will be changed or deformed during the alignment process to provide a new alignment plane.

The alignment element 110 abuts a contact area 114 of the first surface 108 of the sensor board 104. The contact area 114 may either include one continuous area of the surface 108 of the sensor board 104, or it may include several separate areas. However, to simplify the description, such a collection of separate contact areas will also be referred to as "the contact area". The contact area 114 in FIG. 1 is arranged in an area of the first surface 108 which surrounds the image sensor 106.

A biasing element 112A, in FIG. 1 in the form of an elastic clip, holds the camera arrangement 100 together by clamping the sensor board 104 to the optics unit 102, with the alignment element 110 sandwiched between the two. Such a clip allows a simple and efficient assembly process for the camera arrangement 100. When assembling the camera arrangement 100, the optics unit 102 and the sensor board 104 are typically positioned such that the alignment element 110 abuts the sensor board 104, and the clip is then simply snapped on, such that it will hold the optics unit 102 and the sensor board 104 in place relative each other and bias the alignment element 110 into abutment with the contact area 114.

Figure 6:
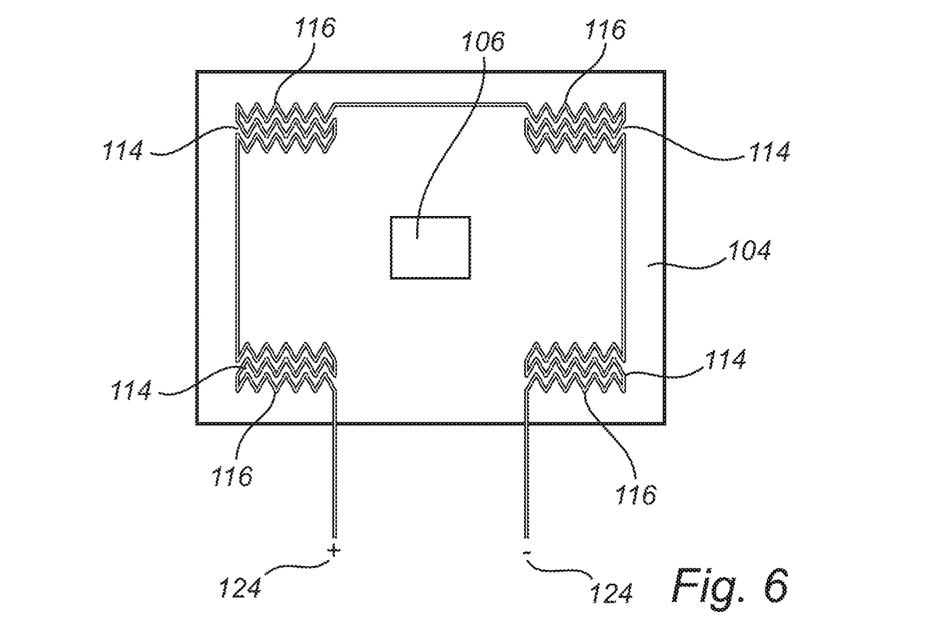
FIG. 6 shows a sensor board.

As shown in more detail in FIG. 6, a heating element 116 is arranged in the contact area 114. The heating element 116 is typically provided in the form of a resistive heating element, e.g., an electrically conductive thread, filament, trace or plate, which may be embedded in the sensor board surface or arranged on the sensor board surface. When a current is provided to the heating element 116 via connections 124, the resistive heating element will heat up and transfer heat to the alignment element 110, which will heat the thermoplastic material to a temperature of at least the glass transition temperature of the thermoplastic material, in at least the end parts of the alignment element 110 being closest to the contact area 114. This in turn makes the heated thermoplastic material soft and deformable, and will allow changing the plane of alignment for the sensor board 104 in relation to the optics unit 102.

The end part of the alignment element 110, the very end of which is in contact with the contact area 114 and receives the heat from the heating element 116 during the alignment process, may have a rounded (as illustrated in FIG. 1) or tapered (as illustrated in e.g., FIG. 2) cross sectional shape. This has the effect of reducing the amount of heat needed to soften the thermoplastic material and this in turn may reduce the power needed and shorten the time for the alignment process.

The alignment process typically will use some sort of optical alignment jig, and during the alignment process the pre-assembled camera arrangement 100 will be placed in the jig, the heating elements 116 will be activated and some type of adjustment device, such as adjustment pins or a plate, or a gripping device will contact the sensor board 104 or the optics unit 102 and align the two by changing the shape (height) of part of the softened alignment element 110 to create a new alignment plane for the sensor board 104 for which the optical axis of the lens 103 is perpendicular to the image sensor 106.

The alignment may either be performed as an active alignment where the image from the image sensor 106 is analyzed to find the proper relative position of the sensor board 104 and the optics unit 102, or the jig may be configured to accomplish a mechanical alignment of the surface of the sensor board 104 or the image sensor with the optics unit 102. In its simplest form this would be to align the plane of the sensor board 104 in parallel to the plane of the side of the optics unit 102 facing the sensor board 104.

When the alignment is accomplished, the heat provided by the heating element 116 is turned off and the material of the alignment element 110 is allowed to cool below the glass transition temperature such that it again solidifies, thereby providing a new stable alignment plane for the sensor board 104. Active cooling may be added, e.g., by a fan blowing cold air, in order to speed up the cooling. The camera arrangement 100 is then removed from the jig.

Figure 7:
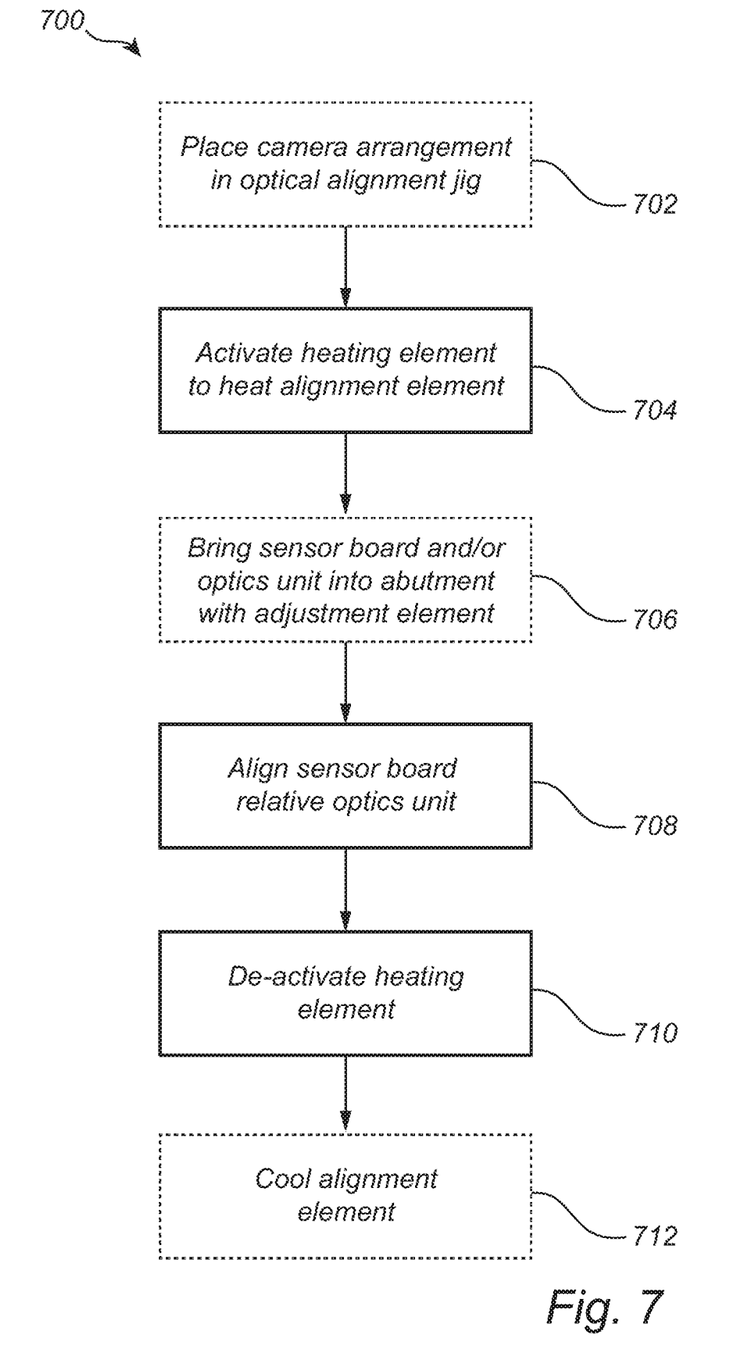
FIG. 7 illustrates a method for aligning a sensor board relative an optics unit in the camera arrangement illustrated in FIGS. 1-5.

FIG. 7 illustrates the method of aligning the sensor board 104 to the optics unit 102 in the camera arrangement 100.

In a first (optional) step 702, the camera arrangement 100 is placed in an optical alignment jig which is equipped for aligning the sensor unit 104 and the optics unit 102 in relation to each other. The heating element 116 in the contact area 114 of the sensor board 104 is then activated in step 704 to transfer heat to the alignment element 110 abutting the contact area 114, such that at least the part of the alignment element 110 which is closest to the contact area 114 is heated to at least the glass transition temperature. In this way, it will become possible to change the shape, typically the height of the alignment element 110, by applying a force to it via the sensor board 104 or the optics unit 102.

In an optional step 706, the sensor board 104 or the optics unit 102 (or both) are brought into contact with an adjustment element, such as a set of adjustment pins, an adjustment plate or some type of device gripping the sensor board 104 or the optics unit 102. In step 708, the sensor board 104 and the optics unit 102 are then aligned to each other, e.g., by the adjustment element applying a force to the sensor board 104 or to the optics unit 102, which in turn will deform or change the shape of part of the heated alignment element 110 such that a new alignment plane is formed for the sensor board 102.

In step 710, the heating element 116 is de-activated, and the alignment element 110 is allowed to cool to a temperature below the glass transition temperature. In an optional step 712, active cooling, e.g., by applying cool air (i.e. air being cooler than the glass transition temperature), is provided to the alignment element 110 to speed up the cooling.

While being described in connection with the embodiment illustrated in FIG. 1, the alignment method 700 is equally applicable to the embodiments depicted in FIGS. 2-5, which will be described in more detail below. Features of these embodiments that are similar to those that are discussed in connection with FIG. 1 will not be discussed in detail again.

Figure 2:
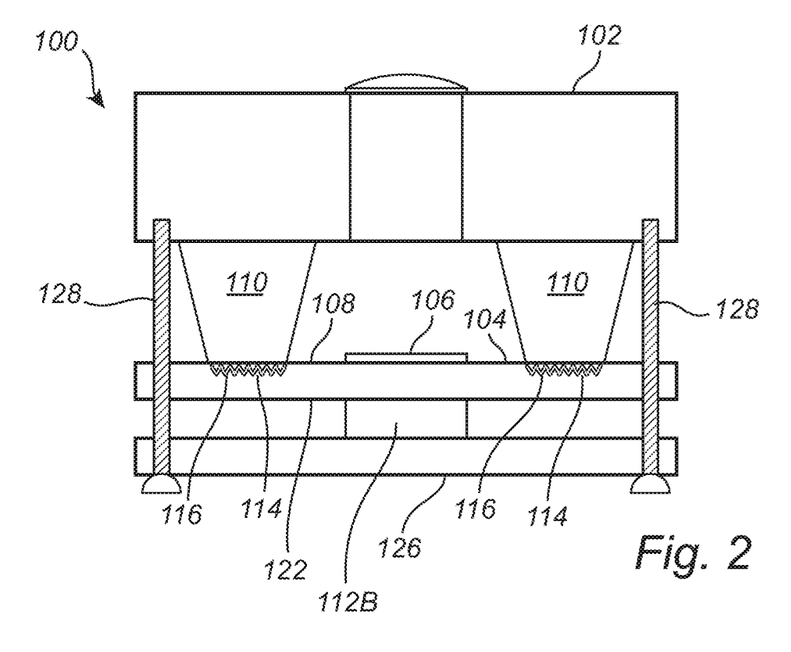

FIG. 2 shows the camera arrangement 100 in another embodiment thereof. In this variant, the biasing element 112B is provided in the form of an elastically compressible element, such as an elastic pad, a leaf spring or a compression spring, which is located on a plate 126 next to a second surface 122 of the sensor board 104. A screw connection 128 fixedly attaches the plate 126, with the biasing element 112B, to the optics unit 102. The biasing element 112*6* will be compressed to some degree by tightening the screw connection 128, such that the biasing element 112B will bias the sensor board 104 into abutment with the alignment element 110. The alignment element 110 is located between the sensor board 104 and the optics unit 102, in the same way as in the embodiment shown in FIG. 1.

Figure 3:
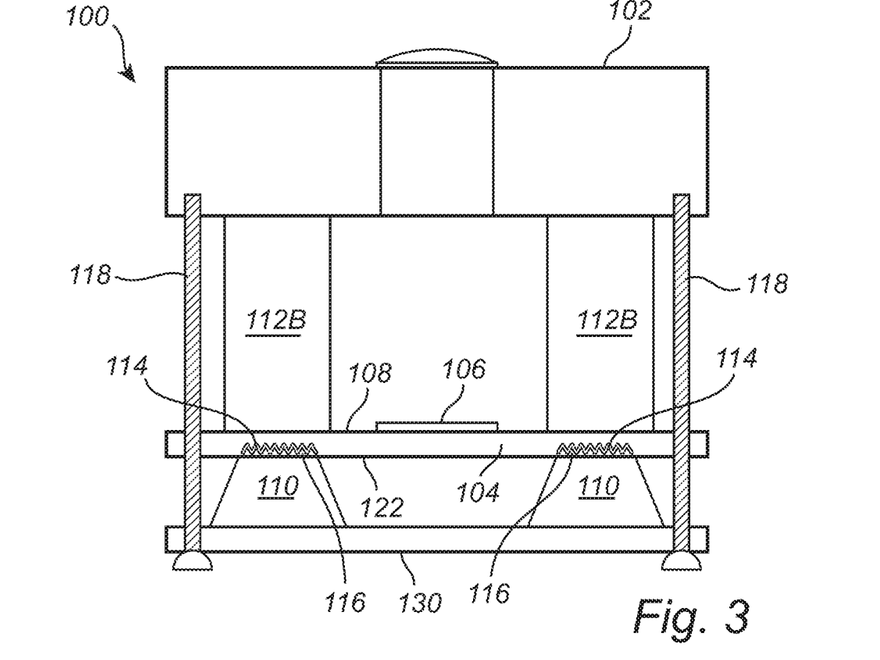

FIG. 3 shows another embodiment of the camera arrangement 100. In this embodiment the biasing element 112B is located between the optics unit 102 and the sensor board 104 and provided in the form of an elastically compressible element, such as an elastic pad, a leaf spring or a compression spring. The biasing element 112B may in this embodiment e.g., be ring-shaped, have an elliptical cross section, or have two or more ridges or pillars that at least partly surround the image sensor 106. The biasing element 1126 is at least partly compressed between the first surface 108 of the sensor board 104 and the optics unit 102 and thereby biases the sensor board 104 into abutment with the alignment element 110, which in this embodiment is located abutting the second surface 122 of the sensor board 104. In this embodiment the contact area 114 with heating element 116 is located at the second surface 122.

The alignment element 110 is held by, or attached to, a plate 130, which in turn is fixedly attached by a screw joint 118 to the optics unit 102. The tightening of the screw joint 118 provides the compression of the biasing element 112B.

Figure 4:
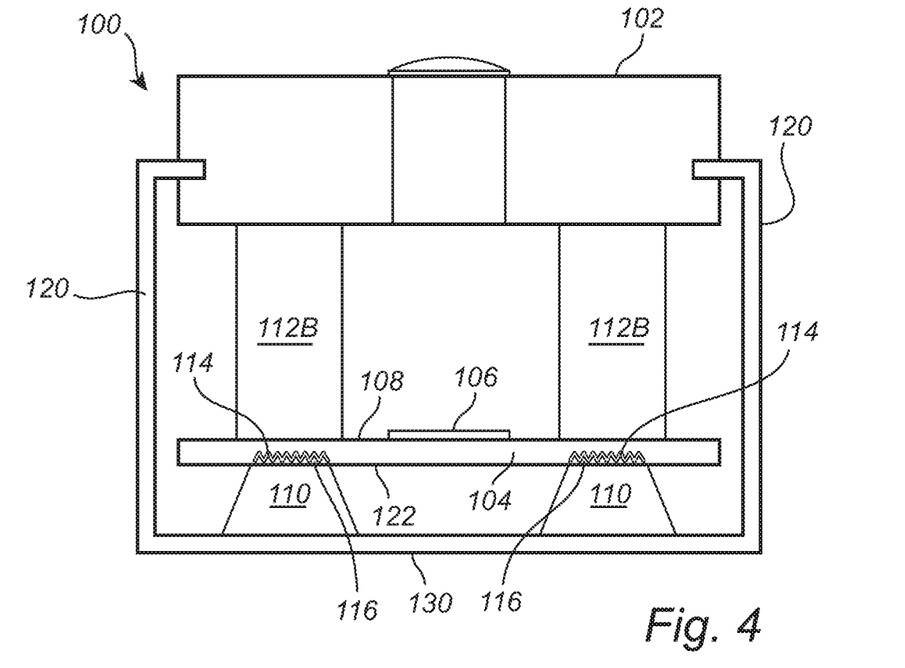

FIG. 4 shows another embodiment of the camera arrangement 100 which is similar to the embodiment shown in FIG. 3. The difference is that a second clip 120 is provided instead of the screw connection or joint 118. The clip 120 may conveniently be formed in one piece with the plate 130. This second clip 120 is essentially non-elastic, and dimensioned such that the biasing effect forcing the alignment element into contact with the contact areas 114 is provided by the biasing element 112B being at least partly compressed by the second clip 120 located between first surface 108 of the sensor board 104 and the optics unit 102.

Figure 5:
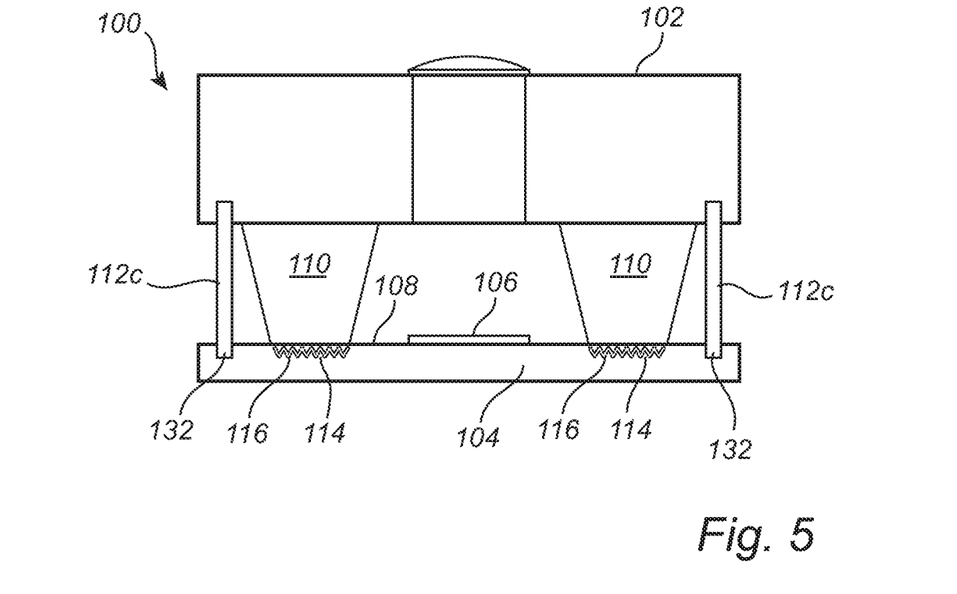

FIG. 5 shows yet another embodiment of the camera arrangement 100 which is similar to the embodiment shown in FIG. 1. In the FIG. 5 variant, one or more magnets 112C attach the sensor board 104 to the optics unit 102. Two magnets 112C are illustrated, but any number that provides a stable and secure attachment can be used, such as more than two or only one. In the latter case, the magnet 112C typically have an elongated shape or a circular shape. The magnets 112C are typically attached to the optics unit 102 by being molded into the optics unit 102, and metallic elements 132, to which the magnets 112C are magnetically attracted, are arranged at matching positions at the sensor board 104. The metallic elements 132 are typically in the form of elastically compressible leaf springs that provide elastic properties to the magnetic attachment embodiment. Similar to the FIG. 1 embodiment, the alignment element 110 is arranged between sensor board 104 and the optics unit 102.

The person skilled in the art realizes that the present invention by no means is limited to the preferred embodiments described above. On the contrary, many modifications and variations are possible within the scope of the appended claims. For example, other types of heating elements than the ones exemplified above may be utilized in order to achieve a heating of the alignment element such that at least a part of the alignment element reaches the glass transition temperature. Moreover, other thermoplastic materials than the ones exemplified above may be used for achieving the desired characteristics.

The invention claimed is:

1. A camera arrangement comprising:
   an optics unit;
   a sensor board with an image sensor attached to a first surface of the sensor board facing the optics unit;
   an alignment element formed by a thermoplastic material; wherein the alignment element is fixedly attached to the optics unit;
   a biasing element which is configured to bias the alignment element into abutment with a contact area of the sensor board; and
   a heating element which is arranged in the contact area, and which upon activation is configured to transfer heat to the alignment element, such that the alignment element is heated at least partly to a temperature of at least the glass transition temperature of the thermoplastic material, for enabling alignment of the sensor board relative the optics unit.

2. The camera arrangement of claim 1, wherein the heating element is a resistive heating element.

3. The camera arrangement of claim 1, wherein an end part of the alignment element configured to abut the contact area has a rounded or tapered cross-sectional shape.

4. The camera arrangement of claim 1, wherein the alignment element is formed in one piece with the optics unit.

5. The camera arrangement of claim 1, wherein the alignment element is located between the optics unit and the sensor board, and wherein the contact area is located in an area of the first surface surrounding the image sensor.

6. The camera arrangement of claim 1, wherein the biasing element comprises a first clip biasing the sensor board towards the optics unit.

7. The camera arrangement of claim 1, wherein the biasing element comprises at least one magnet attached to the sensor board and to the optics unit, wherein the one magnet is elastically attached to at least one of the sensor board and the optics unit.

8. The camera arrangement of claim 1, wherein the alignment element is fixedly attached to the optics unit via a screw joint or via a second clip.

9. The camera arrangement of claim 8, wherein the biasing element is located between the optics unit and the sensor board, and wherein the contact area is located at a second surface of the sensor board, wherein the second surface is opposite to the first surface.

10. The camera arrangement of claim 1, wherein the biasing element comprises an elastic pad, a leaf spring or a compression spring.

11. The camera arrangement of claim 1, wherein the alignment element comprises a plurality of pillars, or wherein the alignment element comprises a flange, wherein the flange is at least partly ring-shaped or wherein the flange comprises at least two ridges arranged at an angle to each other, or arranged at a distance to each other.

12. A method of aligning a sensor board to an optics unit in a camera arrangement, wherein an alignment element formed by a thermoplastic material is fixedly attached to the optics unit and biased into abutment with a contact area of the sensor board, the method comprising:
   activating a heating element arranged in the contact area, such that heat is transferred to the alignment element for heating the alignment element at least partly to a temperature of at least the glass transition temperature of the thermoplastic material;
   aligning the sensor board relative the optics unit; and
   de-activating the heating element for allowing the alignment element to cool to a temperature below the glass transition temperature.

13. The method of claim 12, wherein the step of aligning the sensor board relative the optics unit comprises:
   placing the camera arrangement including the sensor board and the optics unit in an optical alignment jig;
   bringing the sensor board or the optics unit into abutment with an adjustment element; and the adjustment element applying a force to thereby align the sensor board and the optics unit relative each other.

14. The method of claim 12, wherein the operation of activating the heating element comprises providing a current through a resistive heating element.

15. The method of claim 12, further comprising cooling the alignment element.

16. The camera arrangement of claim 2, wherein an end part of the alignment element configured to abut the contact area has a rounded or tapered cross-sectional shape.

* * * * *